April 14, 1970     A. JORTIKKA     3,506,048
SHOPPING BAG
Filed July 9, 1968
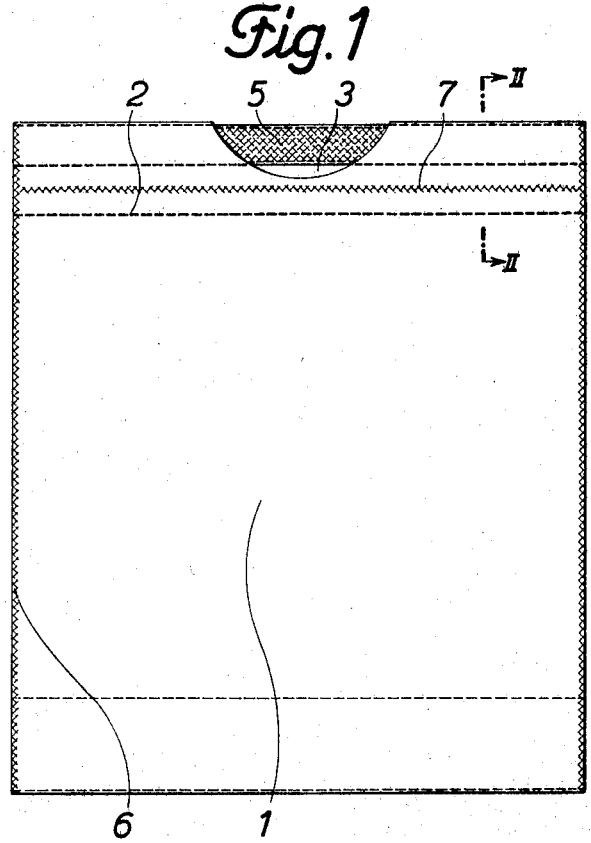
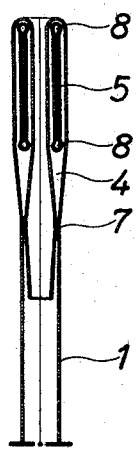

United States Patent Office 3,506,048
Patented Apr. 14, 1970

3,506,048
SHOPPING BAG
Annikki Jortikka, Murtokatu 3B 62, Jarvenpaa, Finland
Filed July 9, 1968, Ser. No. 743,404
Claims priority, application Finland, Feb. 16, 1968, 412/68
Int. Cl. B65d 33/10
U.S. Cl. 150—1.7    4 Claims

ABSTRACT OF THE DISCLOSURE

The present invention concerns a shopping bag of plastic foil provided with handles made of plastic ribbon and at the mouth of which a channel has been formed for each of the two handles, in which an opening has been cut so that the handles are exposed for grasping, the ends of the handles having been fixed to the plastic foil by the same welded seam by which the sides of the bag have been closed. The invention is characterized in that the handles have been formed from thin plastic tubing which, while still hot, has been pressed flat so that the walls of the tubing adhere to each other.

---

Shopping bags of plastic foil have the drawback that the handles tend to cut through the plastic material of the shopping bag when the bag is loaded. The handles may be manufactured as an extruded ribbon with rounded edges. But experience has shown that the extrusion die wears down rapidly with the consequence that the ribbon will have sharp edges, which cut through the material of the shopping bag.

The present invention is intended to eliminate this drawback. The invention is characterized in that the handles have been shaped of thin plastic tubing which, while still hot, has been pressed flat so that the walls of the tube material adhere to each other. A handle of this kind has round edges so that there is no fear of the bag material being cut through.

The effect achieved by means of the invention may furthermore be increased by the means that the plastic tubing has been pressed flat with such small force that small-diameter, air-filled channels remain on the edges of the tubing. This is simply achieved by producing inside the tubing emerging from the extrusion die a small overpressure. When the tubing is compressed to a flat ribbon with small force, small-diameter, air-filled channels remain on the edges of the ribbon, where the resistance of the tubing material against bending is highest.

According to the invention the handles may be formed of very thin plastic tubing, that is of such tubing which has a wall thickness in the order of 0.01 to 0.03 mm. In other words the wall thickness of this plastic tubing is in the same order as that of the material of the shopping bag itself.

It is a known fact that plastic ribbon is stretched in some amount under load. In order that stretching of the handles of a shopping bag according to the invention might be prevented, it is expedient according to an advantageous embodiment of the invention that the handles which have been pressed into the shape of a ribbon are pre-stretched.

The invention is described for the purposes of its illustration with reference to the attached drawing, in which FIG. 1 shows the shopping bag, flattened into a plane, and FIG. 2 shows the section along line II—II in FIG. 1.

Shopping bags according to the invention can be simply made from tube-shaped plastic foil 1 having folds on both edges. The plastic foil may consist e.g. of polyethylene or polyvinyl chloride, and its thickness may be in the order of 0.01 to 0.1 mm.

When the shopping bags are being made, openings 3 are punched in one edge of the continuous tubing 1. The bottom of the fold 2 on the same edge is cut open. Into the channels 4 produced in this manner, which are open toward the interior of the tubing, handle ribbons 5 are guided. At given intervals, the tubing 1 is cut across and the points where it has been cut are closed by welding along the seams 6, which form the lateral edges of the shopping bag. At the same time the handle ribbons 5 will be cut off and fixed by welding to the lateral edges 6 of the bag. Finally, the channels 4 are closed with the welded seams 7. In some instances, however, the channels 4 may be left open. All the operations described above may be arranged to take place automatically so that the share of manual work expended in making the shopping bags is negligible.

According to the invention, the handle ribbons 5 have been shaped from thin plastic tubing which has been pressed flat while still hot so that the walls of the tubing have adhered to each other. The plastic tubing has been pressed flat with such small force that on the edges of the tubing, where resistance against bending is highest, there have remained small-diameter, air-filled channels 8. At the pressing operation of the plastic tubing air has been blown into it to create a slight overpressure, whereby the forming of the channels 8 is promoted. A plastic ribbon of this kind has rounded edges so that there is no fear of the plastic foil 1 being cut through.

Various embodiments of the invention may naturally vary within the scope of the patent claims presented below.

What is claimed is:

1. Improvement in a shopping bag of plastic foil which has been provided with handles of plastic ribbon and at the mouth of which a channel has been formed for either handle, in which an opening has been cut so that the handles are exposed in order that they may be grasped, the ends of the handles having been fixed to the plastic foil with the same welded seam by means of which the lateral edges of the bag have been closed, wherein the improvement comprises in that the handles have been formed from thin plastic tubing which, while still hot, has been pressed flat so that the walls of the tubing adhere to each other.

2. Shopping bag as in claim 1, characterized in that the plastic tubing has been pressed flat with such small force that on the edges of the tubing there remain small-diameter, air-filled channels.

3. Shopping bag as in claim 1, characterized in that the wall thickness of the plastic tubing constituting the handles is in the order of 0.01 to 0.03 mm.

4. Shopping bag as in claim 1, characterized in that the handles have been compressed into ribbon shape and have been prestretched.

References Cited

UNITED STATES PATENTS 3,029,853  4/1962  Piazze _____ 150—11
3,414,032  12/1968  Jortikka _____ 150—1.7

DONALD F. NORTON, Primary Examiner

U.S. Cl. X.R.

150—11, 12; 229—54